US010132691B2

United States Patent
Kato et al.

(10) Patent No.: US 10,132,691 B2
(45) Date of Patent: Nov. 20, 2018

(54) SENSOR SHEET

(71) Applicant: TOYOTA BOSHOKU KABUSHIKI KAISHA, Aichi-ken (JP)

(72) Inventors: Kohei Kato, Aichi-ken (JP); Masami Kataoka, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 144 days.

(21) Appl. No.: 15/250,267

(22) Filed: Aug. 29, 2016

(65) Prior Publication Data

US 2017/0059415 A1   Mar. 2, 2017

(30) Foreign Application Priority Data

Sep. 1, 2015 (JP) ................. 2015-171720

(51) Int. Cl.
| | | |
|---|---|---|
| *B60N 2/58* | (2006.01) | |
| *G01K 1/14* | (2006.01) | |
| *B60N 2/56* | (2006.01) | |
| *B60N 2/90* | (2018.01) | |

(52) U.S. Cl.
CPC ............. *G01K 1/14* (2013.01); *B60N 2/5642* (2013.01); *B60N 2/5678* (2013.01); *B60N 2/90* (2018.02); *G01K 2205/00* (2013.01); *G01K 2213/00* (2013.01)

(58) Field of Classification Search
CPC ........ B60N 2/002; B60N 2/5685; B60N 2/58; G01K 13/00; A61B 5/6893; B60W 2040/0881; G01M 7/025

USPC ... 374/141, 163, 185, 5, 137, 166, 109, 110, 374/111, 112
See application file for complete search history.

(56) References Cited

U.S. PATENT DOCUMENTS

| | | | | |
|---|---|---|---|---|
| 6,859,617 | B2 * | 2/2005 | Goodsel ................. | H05B 3/262 219/543 |
| 9,103,747 | B2 * | 8/2015 | Galbreath ............ | A61B 5/1036 |
| 9,404,815 | B2 * | 8/2016 | Arunasalam ........... | G01K 13/02 |
| 9,677,947 | B2 * | 6/2017 | Hoenicka ................. | G01K 1/08 |
| 2003/0094959 | A1 * | 5/2003 | Hoisington ....... | B60R 21/01532 324/694 |
| 2004/0004070 | A1 * | 1/2004 | Sullivan ................. | H05B 3/342 219/494 |

(Continued)

FOREIGN PATENT DOCUMENTS

| | | | | |
|---|---|---|---|---|
| DE | 4035371 | A1 * | 5/1992 | .......... G01N 27/225 |
| JP | 2010-264092 | | 11/2010 | |

*Primary Examiner* — Gail Kaplan Verbitsky
(74) *Attorney, Agent, or Firm* — Greenblum & Bernstein, P.L.C.

(57) ABSTRACT

A sensor sheet has a planer shape to be disposed on a surface of a vehicle seat. The sensor sheet includes: a pliable planar main body capable of being disposed along the surface of the vehicle seat; a plurality of detecting portions provided in the main body; and a wiring line that is configured to supply power to each of the detecting portions, wherein each of the plurality of detecting portions is configured to transmit information detected from the surface of the vehicle seat to a controller through a wired or wireless communication, wherein the main body has an air permeability to enable circulation of air in a thickness direction, and wherein the plurality of detecting portions are arranged at a suitable interval in a surface direction of the main body.

7 Claims, 4 Drawing Sheets

(56) References Cited

U.S. PATENT DOCUMENTS

| | | | |
|---|---|---|---|
| 2004/0169579 A1* | 9/2004 | Mattes | G01K 7/186 338/25 |
| 2011/0295466 A1* | 12/2011 | Ostu | B60N 2/002 701/45 |
| 2013/0213950 A1* | 8/2013 | Bulgajewski | H05B 1/00 219/209 |
| 2014/0231410 A1* | 8/2014 | Rothschild | B62B 9/00 219/480 |
| 2015/0061345 A1* | 3/2015 | Van Der Linden | H05K 1/028 297/452.1 |
| 2017/0305301 A1* | 10/2017 | McMillen | B60N 2/002 |
| 2017/0350774 A1* | 12/2017 | Woodbury | G01L 1/243 |

\* cited by examiner

SENSOR SHEET

CROSS-REFERENCE TO RELATED APPLICATION

This application claims priorities from Japanese Patent Application No. 2015-171720 filed on Sep. 1, 2015, the entire subject matters of which is incorporated herein by reference.

TECHNICAL FIELD

The present invention relates to a planar sensor sheet provided with a plurality of detecting portions capable of detecting information such as temperature or pressure on a surface of a vehicle seat and a wiring line capable of supplying electric power to each of the detecting portions.

BACKGROUND

In a vehicle seat, there is a demand for a configuration capable of measuring a temperature or pressure distribution on a seating surface, for example, when a passenger is seated and controlling a shape of the seating surface or an air blow amount of a seat ventilation system based on the measured information. For example, a seat is proposed which has a configuration being embedded with a plurality of airbags, a pressure detecting unit, and an inflation/deflation controller. An example of such configuration is disclosed in JP-A-2010-264092. A plurality of airbags are bags to be inflated by an inflow gas and arranged in the backside of the seating surface of a seat in parallel while they communicate with the inflation/deflation controller. Each airbag is provided with a pressure detecting unit capable of detecting the pressure received by each airbag. In the configuration of the related art, the pressure received by each airbag when a passenger is seated is detected by the pressure detecting unit, and the detected pressure information is transmitted to the inflation/deflation controller. Furthermore, the inflation/deflation controller controls an inflation/deflation rate for each airbag based on individual pressure information to improve support performance by appropriately changing a shape of the seating surface.

However, in the configuration of the related art, it is necessary to provide a plurality of pressure detectors inside the seat and arrange individual wiring lines in each pressure detector. For this reason, in the technique of the related art, an internal structure of the seat becomes complicated, and it is not easy to apply in consideration of influence on other members arranged inside the seat such as an air conditioner or a heater. In this regard, the planar sensor sheet may be arranged on a seating surface of the seat. However, in this case, it is required to avoid an arrangement state of the sensor sheet from being significantly different from a practical state of the seating surface. For example, when the temperature distribution on the seating surface is detected, original air permeability of the vehicle seat may be significantly degraded due to the sensor sheet, and the information obtained from the sensor sheet may become unreliable.

SUMMARY

In order to solve such a problem, one of objects of the invention is to provide a sensor sheet that is capable of more accurately detecting information on the surface of the vehicle seat using a planar sensor sheet arranged on the surface of the vehicle seat.

According to an aspect of the present disclosure, there is provided a sensor sheet having a planer shape to be disposed on a surface of a vehicle seat, the sensor sheet including: a pliable planar main body capable of being disposed along the surface of the vehicle seat; a plurality of detecting portions provided in the main body; and a wiring line that is configured to supply power to each of the detecting portions, wherein each of the plurality of detecting portions is configured to transmit information detected from the surface of the vehicle seat to a controller through a wired or wireless communication, wherein the main body has an air permeability to enable circulation of air in a thickness direction, and wherein the plurality of detecting portions are arranged at a suitable interval in a surface direction of the main body.

DETAILED DESCRIPTION

Figure 1:
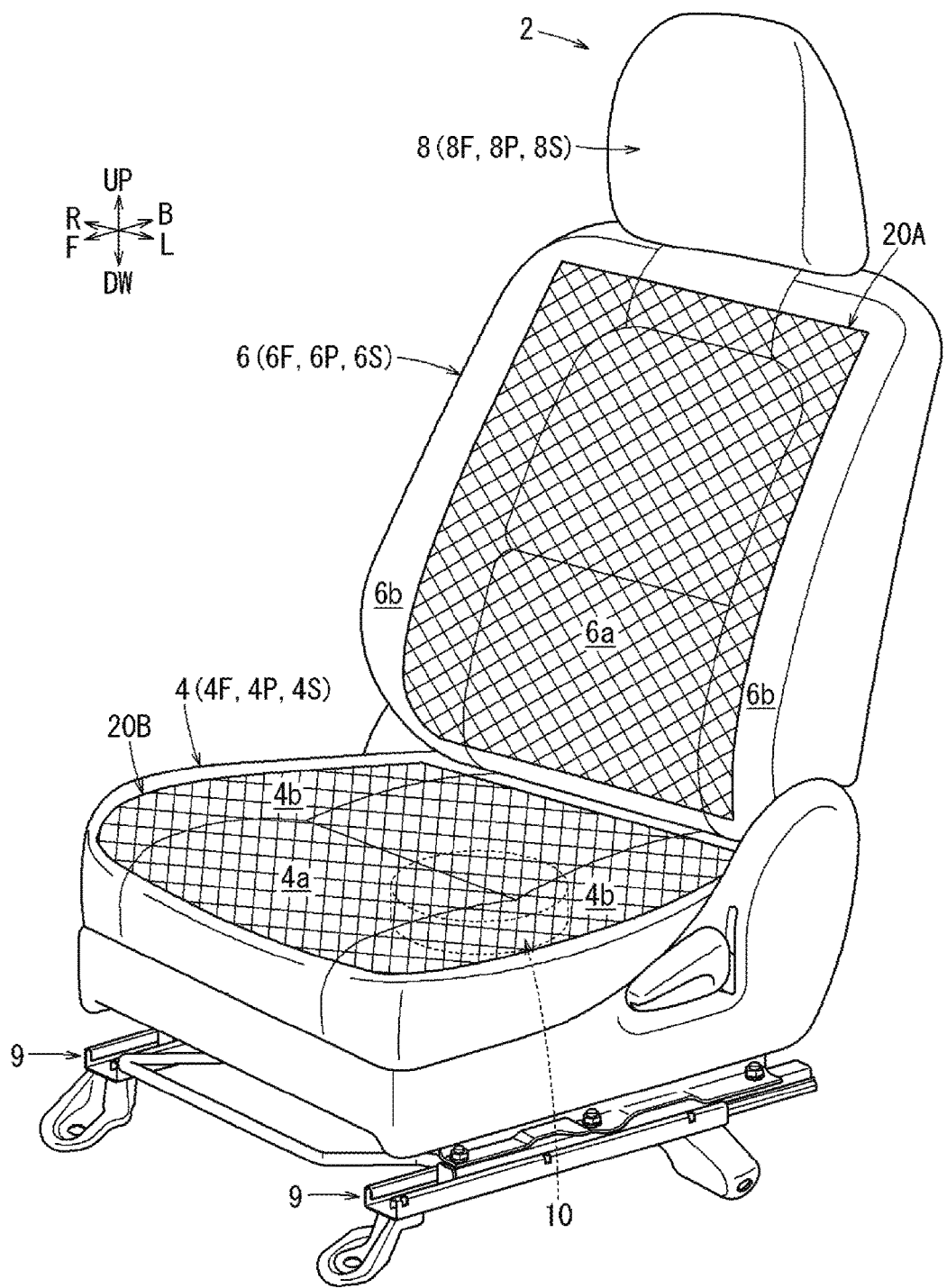
FIG. 1 is a perspective view illustrating a vehicle seat.

Embodiments according to the present disclosure will now be described with reference to FIGS. 1 to 4. In each drawing, "F" denotes a front direction of a vehicle seat, "B" denotes a rear direction of the vehicle seat, "UP" denotes an upward direction of the vehicle seat, "DW" denotes a downward direction, "R" denotes a right direction of the vehicle seat, and "L" denotes a left direction of the vehicle seat. The vehicle seat 2 of FIG. 1 has a seat cushion 4, a backrest 6, and a headrest 8. each of these seat components has seat frames 4F, 6F, and 8F serving as a seat base, seat pads 4P, 6P, and 8P, and seat covers 4S, 6S, and 8S that cover the seat pads. According to this embodiment, a lower part of the backrest 6 is foldably connected to a rear part of the seat cushion 4, and the headrest 8 is arranged on top of the backrest 6 in an erected state. In addition, the seat cushion 4 is fixed to a vehicle floor surface using a seat rail 9, so that the vehicle seat 2 can move relatively to the vehicle floor surface on the seat rail 9.

According to this embodiment. As shown in FIG. 1, a seat ventilation system 10 capable of blowing gas is provided in the backside of the seat cushion 4 and communicates with the backrest 6 through a duct member (not shown). As a mechanism of such a type of the seat ventilation system 10, an axial type mechanism that blows the air along an axial direction or a centrifugal mechanism that receives the air from the axial direction and blows the air in the centrifugal direction may be exemplified. In addition, the gas transmitted from the seat ventilation system 10 blows out from at least one of the seating surfaces of the seat cushion 4 and the backrest 6 through a flow passage (not shown) provided in the seat pads 4P and 6P. Furthermore, each seating surface is divided into top plate main portions 4a or 6a located in the center as seen from the seat width direction and top plate side portions 4b and 6b bulging in both sides of the top plate main portions 4a and 6a. Although the flow passage according to this embodiment is arranged in the top plate main portions 4a and 6a, it may be provided in the top plate side portions 4b and 6b as well.

In such a type of the vehicle seat 2, there is a demand for a configuration capable of measuring a temperature distribution of the seating surface, for example, when a passenger is seated, in advance and controlling the air blow amount of the seat ventilation system 10 based on the measured temperature information. In this regard, according to this embodiment, a planar sensor sheet 20A is disposed on the seating surface of the backrest 6, and a planar sensor sheet 20B is disposed on the seating surface of the seat cushion 4. In addition, a temperature distribution of the corresponding seating surface is measured using each sensor sheet 20A and 20B. However, in such a configuration, it is desirable to more accurately detect information on each seating surface using the sensor sheets 20A and 20B. In this regard, according to this embodiment, information on the seating surface of the vehicle seat 2 is more accurately detected using the planar sensor sheets 20A and 20B as described below. Each configuration will now be described in more detail.

Figure 2:
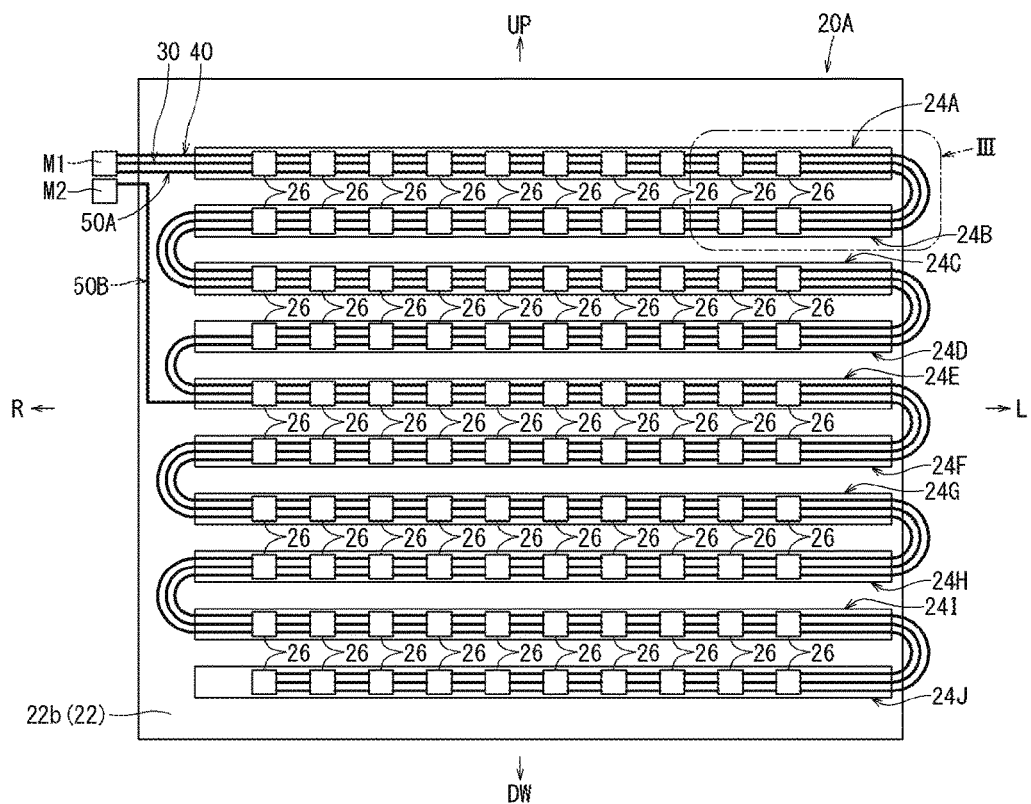
FIG. 2 is a schematic front view illustrating a sensor sheet.

Here, the sensor sheet 20A of the backrest 6 has an approximately similar configuration to that of the sensor sheet 20B of the seat cushion 4. Therefore, the sensor sheet 20A of the backrest 6 will be described in detail by way of example. The sensor sheet 20A is an approximately rectangular planar member arranged on the seating surface of the backrest 6. As shown in FIG. 2, the sensor sheet 20A has a main body 22, a plurality of substrates 24A to 24J, a plurality of detecting portions 26, a pair of wiring lines 30 and 40, and a pair of wired lines 50A and 50B. As described below, power is supplied to each detecting portion 26 from a power supply unit M1 through a pair of wiring lines 30 and 40. Furthermore, temperature information obtained from each detecting portion 26 is transmitted to a controller M2 through a pair of wired lines 50A and 50B, so that the temperature distribution on the seating surface is created by the controller M2.

Figure 4:
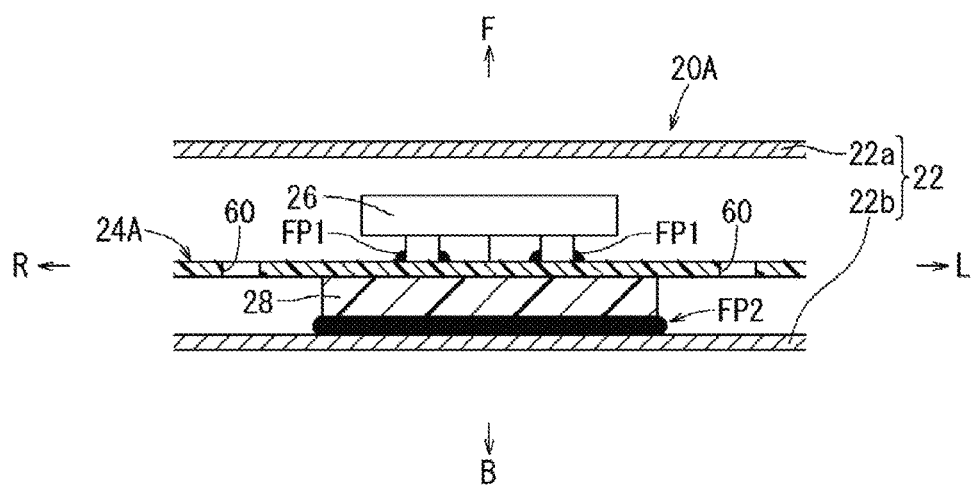
FIG. 4 is a cross-sectional view illustrating the sensor sheet.

The main body 22 is an approximately rectangular planar member having flexibility and air permeability. As shown in FIG. 4, a pair of planar members 22a and 22b may be formed in a pouch shape. As such a type of the planar member of the main body 22, for example, a 2-dimensional net material such as a mesh material, a 3-dimensional net material manufactured by weaving fibers in a 3-dimensional manner, fabric (such as woven fabric, knit, and non-woven fabric), highly breathable slab urethane (air permeability: 200 $cc/cm^2 \cdot sec$ to 400 $cc/cm^2 \cdot sec$), a porous film formed of resin, elastomer, or rubber may be employed. Out of them, the 2-dimensional net material such as a mesh material formed of a resin wire material may be preferably employed as a material of the main body 22 in terms of air permeability or physical properties. Here, a dimension of the main body 22 is not particularly limited as long as a desired temperature distribution on the seating surface can be measured. According to this embodiment, the dimension of the main body 22 is set such that at least the entire surface of the top plate main portion 6a can be covered. Further, although a circumferential edge of the main body 22 may be undetachably attached to the top plate side portion 6b through various methods such as bonding or suturing, it is preferable that the circumferential edge of the main body 22 be provided detachably. For example, by providing the main body 22 detachably using a simple method such as glueing, it is possible to easily reuse the main body 22 in another vehicle seat 2.

Figure 3:
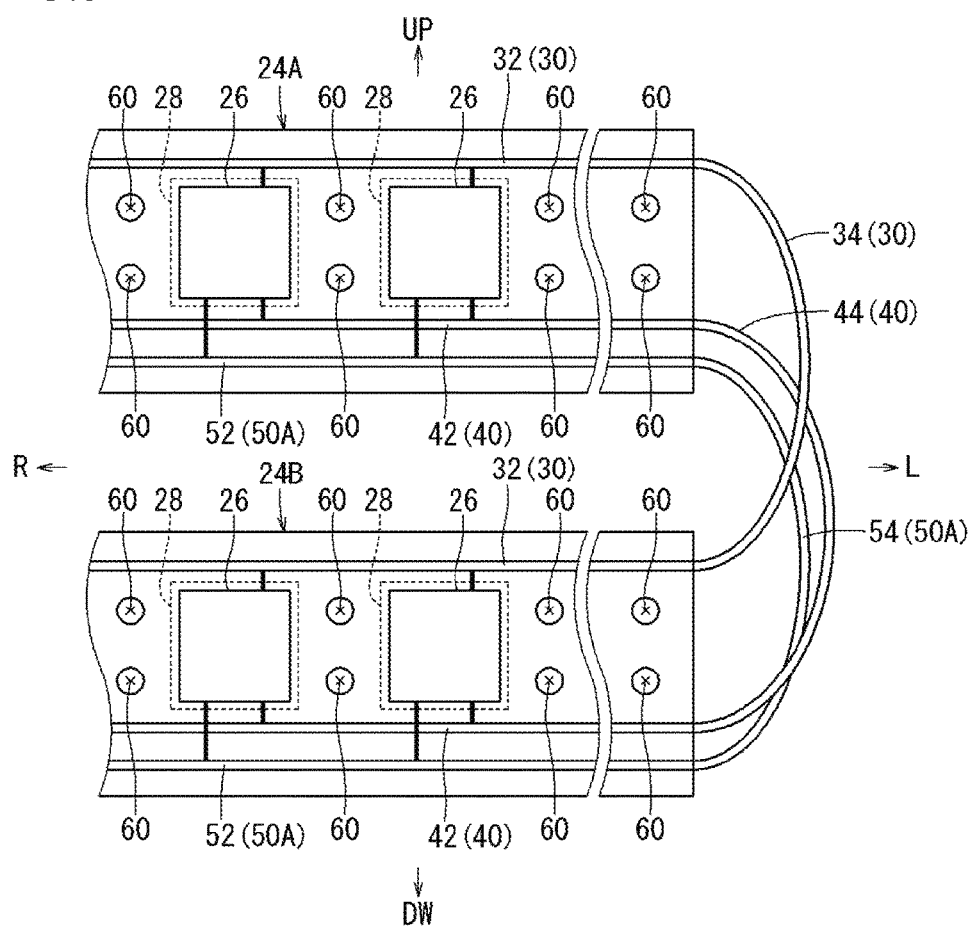
FIG. 3 is a schematic front view illustrating a part of the sensor sheet.

A plurality of substrates (first to tenth substrates 24A to 24J) are flexible film-like flat members as illustrated in FIG. 2. Here, the first to tenth substrates 24A to 24J have an approximately similar configuration. Therefore, the first substrate 24A will be described in detail by way of example. As shown in FIGS. 2 and 3, the first substrate 24A has a band shape extending in a seat with direction. The first substrate 24A has a plurality of detecting portions 26, back-lining portions 28, a pair of wiring portions 32 and 42, wiring portions 52, and a plurality of air permeable portions 60 as described below. As a material of such a type of the first substrate 24A, resin such as polyimide, polyetherimide, and polyethylene terephthalate, elastomer, or rubber may be employed. Here, the back-lining portion 28 is a flat plate member that supports each detecting portion 26 and may be fixed to the backside of the first substrate 24A. According to this embodiment, a plurality of back-lining portions 28 have an approximately rectangular shape similar to that of the detecting portion 26 described below as illustrated in FIGS. 3 and 4. In addition, a plurality of back-lining portions 28 are arranged in positions corresponding to those of each detecting portion 26 at a suitable interval. As a material of such a type of the back-lining portions 28, resin harder than a material of the first substrate 24A is preferably employed. For example, a plate material formed of glass epoxy may be employed. Furthermore, the air permeable portions 60 are portions where gas can pass through in the thickness direction of the main body 22. According to this embodiment, the air permeable portion 60 is a hole of the first substrate 24A perforated in the thickness direction. Moreover, a plurality of (or a single) air permeable portions 60 may be provided in positions different from those of the detecting portions 26 and the back-lining portions 28. As a result, it is possible to maintain excellent air permeability of the sensor sheet 20A.

As shown in FIG. 3, the wiring region 32 (42) is a part of each wiring line 30 (40) described below and is used to supply power to each detecting portion 26 described below. According to this embodiment, one of the wiring regions 32 is provided in one side of the first substrate 24A in a lateral direction to ceaselessly extend in a longitudinal direction of the first substrate 24A. In addition, the other wiring region 42 is provided in the other side of the first substrate 24A in the lateral direction to ceaselessly extend in the longitudinal direction of the first substrate 24A. Each of the wiring regions 32 and 42 may be formed, for example, by bonding a thin foil made of metal or alloy on a surface of the first substrate 24A and removing unnecessary parts of the thin foil through etching to obtain a linear shape. In addition, a part of the wiring regions 32 and 42 that is not necessary to be electrically connected may be insulated by forming an overlay or the like. Furthermore, as a material other than the thin foil described above, each wiring region 32 or 42 may be formed of a resin layer containing conductive particles (typically, metal particles or alloy particles), an electrically conducting yarn, or fabric obtained from an electrically conducting yarn. The thin foil, the fabric, or the electrically conducting yarn can be directly attached to the surface of the first substrate 24A through bonding, gluing, sewing, and the like. The resin layer containing conductive particles may be directly attached to the surface of the first substrate 24A through printing, spraying, and the like. The wired region 52 is a part of the wired line 50A (50B) described below and is provided in a position other than that of each wiring region 32 or 42 to ceaselessly extend in the longitudinal direction of the first substrate 24A. Similar to a pair of wiring regions 32 and 42, the wired region 52 may be formed of various types of conductive band or wire materials.

As shown in FIGS. 2 to 4, each of the plurality of detecting portions 26 is an approximately cubic member capable of detecting the surrounding temperature and internally has a temperature detection structure and a transmission structure (not shown). The temperature detection structure is a configuration for detecting the surrounding temperature, and various types of mechanisms such as a thermocouple type, a resistance thermometer type, a radiation type, and a bimetal type may be employed. The transmission structure is a configuration capable of transmitting temperature information detected by the temperature detection structure to the outside in a wired or wireless manner. According to this embodiment, the transmission structure may transmit temperature information to the controller M2 through the wired line 50A (50B) described below. According to this embodiment, a plurality of detecting portions 26 are arranged on the surface of the first substrate 24A at a suitable interval as illustrated in FIG. 1 and are electrically connected to each of the wiring portions 32 and 42 and each of the wiring regions 52 as illustrated in FIG. 2. Here, how to attach each of the detecting portions 26 is not particularly limited. According to this embodiment, the detecting portion 26 may be provided in a fixed portion FP1 on the surface of the first substrate 24A through soldering and the like as illustrated in FIG. 4. In addition, the back-lining portion 28 is arranged on the backside of the fixed portion of each detecting portion 26. Therefore, each detecting portion 26 is supported by the back-lining portion 28 so that they are stably arranged on the surface of the first substrate 24A.

As shown in FIG. 2, a plurality of substrates 24A to 24J are arranged in the main body 22 vertically in parallel at a suitable interval. In this case, supposed that the sensor sheet 20A is installed in the backrest 6, the first to tenth substrates 24A to 24J are arranged vertically in this order from the top while they are directed in the seat width direction. In addition, each substrate 24A to 24J can be installed in a suitable position of the main body 22 by fixing each back-lining portion 28 fixed to the backside of each substrate 24A to 24J to the planar member 22b in the backside of the main body 22 through bonding and the like as illustrated in FIG. 4.

Before or after the process described above, a pair of wiring lines (including first and second wiring lines 30 and 40) are arranged in a surface direction of the main body 22 while they are electrically connected to each of the plurality of detecting portions 26. The pair of wiring lines 30 and 40 are used to supply power to each detecting portion 26 and are electrically connected to the power supply unit M1 disposed outside the main body 22. In addition, the first wiring line 30 is a portion for connecting the one wiring region 32 of each substrate 24A to 24J and a line 34 disposed between the neighboring substrates in series as illustrated in FIGS. 2 and 3 and is formed to meander across the main body 22 as seen from the front view. Here, the line 34 is a bendable cable used to electrically connect the wiring region 32 of the neighboring substrates to each other. Similarly, the second wiring line 40 is a portion for connecting the other wiring region 42 of each substrate 24A to 24J and another line 44 disposed between the neighboring substrates in series and is formed to meander across the main body 22 as seen from the front view. In addition, the first wiring line 30 is connected to any one of positive and negative electrodes of the power supply unit M1, and the second wiring line 40 is connected to the other electrode of the power supply unit M1. As a result, according to this embodiment, a pair of wiring lines 30 and 40 is shared between a plurality of detecting portions 26 with a simple structure to supply power to each of the detecting portions 26.

A pair of wired lines (including first and second wired lines 50A and 50B) are arranged along a surface direction of the main body 22 while they are electrically connected to each of the plurality of detecting portions 26. Each of the wired lines 50 and 50B is used to transmit temperature information detected by each of the detecting portions 26 to the controller M2 as an electric signal. The first wired line 50A is a portion for connecting the wiring region 52 of the first to fourth substrates 24A to 24D and a signal line 54 disposed between the neighboring substrates in series as illustrated in FIGS. 2 and 3 and is formed to meander across the main body 22 as seen from the front view. Similarly, the second wired line 50B is a portion for connecting the wiring region (no reference numeral) of the fifth to tenth substrates 24AE to 24J and a signal line (no reference numeral) disposed between the neighboring substrates in series and is formed to meander across the main body 22 as seen from the front view. After the temperature information obtained from each detecting portion 26 is transmitted to the controller M2 through each of the wire lines 50A and 50B, the controller M2 creates the temperature distribution of the seat portion. According to this embodiment, information on the plurality of detecting portions 26 is transmitted through the first and second wired lines 50A and 50B in a dividing manner. Therefore, it is possible to rapidly transmit the temperature information from each of the detecting portions 26 to the controller M2.

As shown in FIG. 1, the temperature distributions on each seating surface of the backrest 6 and the seat cushion 4 are detected using the sensor sheets 20A and 20B. In this case, according to this embodiment, the seat ventilation system 10 blows the air, for example, to the seat side by assuming a practical use of the vehicle seat 2. However, it is necessary to avoid the air blow from being interfered by the sensor sheets 20A and 20B. In addition, even when the seat ventilation system 10 is not operated, the information obtained from each of the sensor sheets 20A and 20B may become inaccurate due to the heat accumulated in the space between the sensor sheets 20A and 20B and each seating surface, or other reasons.

In this regard, according to this embodiment, the main body 22 has air permeability by which air and gas can pass through in the thickness direction, and the plurality of detecting portions 26 are arranged at a suitable interval in the surface direction of the main body 22 as illustrated in FIG. 2. As a result, the plurality of detecting portions 26 are arranged in the main body 22 having air permeability at a suitable interval, so that each sensor sheet 20A and 20B has excellent air permeability, and the air blow of the seat ventilation system 10 is not interfered. In particular, according to this embodiment, since each substrate 24A to 24J is arranged at a suitable interval and is provided with the air permeable portions 60, it is possible to maintain excellent air permeability in each of the sensor sheets 20A and 20B. Furthermore, since each sensor sheet 20A and 20B is arranged without failing to consider a practical state of the seating surface, it is possible to more accurately detect information on the seating surface as a surface of the vehicle seat 2. Moreover, since each sensor sheet 20A and 20B is arranged in a corresponding seating surface, it is possible to easily install or remove the sensor sheets 20A and 20B to or from the seat and remarkably reduce the number of processes necessary to prepare the measurement. According to this embodiment, even when a passenger is seated, and each sensor sheet 20A and 20B is pressed, the main body 22 and each substrate 20A to 24J can support the passenger while they are flexed within a suitable range. In addition, since a pair of wiring lines 30 and 40 is shared between a plurality of detecting portions 26, it is possible to reduce the number of lines arranged in each sensor sheet 20A and 20B. For this reason, each sensor sheet 20A and 20B provides an excellent seat feeling without generating discomfort such as hardness or a foreign body sensation. Furthermore, since each sensor sheet 20A and 20B is flexed within a suitable range when a passenger is seated, it is possible to prevent an excessive burden applied to a pair of wiring lines 30 and 40 or a pair of wired lines 50A and 50B and a short circuit generated thereby. Moreover, since each detecting portion 26 is supported by the back-lining portion 28, it is possible to preferably prevent an excessive stress from being applied to the fixed portion FP1 of each detecting portion 26.

As described above, according to this embodiment, a plurality of detecting portions 26 are arranged in the breathable main body 22 at a suitable interval. Therefore, each sensor sheet 20A and 20B has excellent air permeability. For this reason, even when each sensor sheet 20A and 20B is disposed on the seating surface as a surface of the vehicle seat 2, it is possible to prevent failing to consider a practical state of the seating surface and more accurately detect information on the seating surface of the vehicle seat 2. According to this embodiment, since a pair of wiring lines 30 and 40 is shared between a plurality of detecting portions 26, it is possible to obtain a simple structure, compared to a structure having a pair of wiring lines individually provided in each of the plurality of detecting portions 26. Furthermore, according to this embodiment, a plurality of detecting portions 26 and each wiring region 32 or 42 can be stably provided in the main body 22 along with each flexible substrate 24A to 24J in a suitable arrangement relationship. Moreover, according to this embodiment, it is possible to maintain excellent air permeability in each sensor sheet 20A and 20B by providing each substrate 24A to 24J with the air permeable portion 60. For this reason, according to this embodiment, due to each planar sensor sheet 20A and 20B disposed on the surface of the vehicle seat 2, it is possible to more accurately detect information on the surface of the vehicle seat 2.

The sensor sheets according to the invention may be embodied in various forms without limiting to the embodiments described above. For example, although the configurations (such as the shape, the dimension, the location, the number, and the material) of each sensor sheet 20A and 20B have been described in the aforementioned embodiments, they are not intended to limit the invention. For example, the main body may be provided with a single planar member or three or more planar members. In addition, for example, a portion of the main body that covers the top plate main portion may be breathable, and another portion of the main body that covers the top plate side portion may not be breathable. Further, the main body may serve as the seat cover partially or wholly. Further, each wired line may be arranged separately from each electrode portion or may be integrated with one side of each electrode portion. Further, the controller and the power supply unit may be provided separately or integrally with the sensor sheet.

The detecting portion according to this embodiment may be configured to measure various parameters such as temperature, pressure, humidity, sound (noise), light, and an air blow amount. In addition, the detecting portion may be configured to transmit information to the controller in a wireless manner. In this case, the wired line may be omitted. In addition, the detecting portion may be directly provided in the main body instead of the substrate. In this case, the detecting portions may be electrically connected to each other only using lines of the electrode portions. In addition, each of the detecting portions may have a pair of electrode portions. In addition, information obtained from a plurality of detecting portions may be transmitted to the controller through a single wired line or three or more wired lines. In addition, if the substrate has stiffness within a suitable range, the detecting portion may be provided in the substrate without a support of the back-lining portion (by omitting the back-lining portion).

Although the substrate is provided with through-holes as the air permeable portion by way of example in this embodiment, the air permeable portion may be formed by notching an end portion of the substrate. In addition, the substrate may be suitably curved in the thickness direction of the main body. In this case, a gap between the substrate and the main body serves as the air permeable portion. In addition, if the air permeability of the main body is not significantly degraded, the air permeable portion may be removed from the substrate. In addition, the substrate may be fixed to any of the planar members of the main body in a part excluding the back-lining portion.

Although a configuration of the vehicle seat has been described by way of example in this embodiment, it is not intended to limit the configuration of the vehicle seat thereto. For example, various other members such as a seat heater may be provided in the vehicle seat in addition to the seat ventilation system, or other members may be omitted as well. In addition, the seat ventilation system may be a suction type. The configuration of this embodiment may be employed in overall fields of seats such as cars, aircrafts, and electric trains.

As described with reference to the embodiment, according to a first aspect of the disclosure, there is provided a planar sensor sheet that can be disposed on a surface of a vehicle seat, including: a pliable planar main body capable of being disposed along the surface of the vehicle seat; a plurality of detecting portions provided in the main body; and a wiring line that is configured to supply power to each of the detecting portions. In addition, each of the plurality of detecting portions can transmit information detected from the surface of the vehicle seat to a controller in a wired or wireless manner. In this configuration, it is preferable that the information on the surface of the vehicle seat be more accurately detected using the planar sensor sheet disposed on the surface of the vehicle seat.

In this aspect according to the present disclosure, the main body is breathable to enable circulation of gas in a thickness direction, and the plurality of detecting portions are arranged at a suitable interval in a surface direction of the main body. According to the present disclosure, since the breathable main body is provided with a plurality of detecting portions arranged at a suitable interval, the sensor sheet has excellent air permeability. For this reason, even when the sensor sheet is disposed on the surface of the vehicle seat, it is possible to prevent failing to consider a practical state of the seating surface and more accurately detect information on the surface of the vehicle seat.

According to a second aspect of the present disclosure, a pair of the wiring lines are provided along the surface direction of the main body while being electrically connected to each of the plurality of detecting portions. In this case, since a pair of wiring lines are shared between a plurality of detecting portions, a simpler structure can be obtained, compared to a structure having a pair of wiring lines individually provided in each of the plurality of detecting portions According to a third aspect of the present disclosure, the main body has a flexible flat substrate, and the plurality of detecting portions and a pair of wiring regions as a part of the wiring lines are provided in the substrate. In this case, it is possible to suitably provide a plurality of detecting portions and each wiring region in the main body along with the flexible substrate.

According to a fourth aspect of the present disclosure, the substrate has an air permeable portion through which gas is capable of circulating as seen in the thickness direction of the main body. In this case, due to the air permeable portion provided in the substrate, it is possible to maintain excellent air permeability of the sensor sheet.

According to the first aspect of the present disclosure, it is possible to more accurately detect information on the surface of the vehicle seat using the planar sensor sheet disposed on the surface of the vehicle seat. According to the second aspect of the present disclosure, it is possible to more accurately detect information on the seating surface of the vehicle seat using the relatively simple planar sensor sheet. According to the third aspect of the present disclosure, it is possible to suitably detect the information on the surface of the vehicle seat using the planar sensor sheet. According to the fourth aspect of the present disclosure, it is possible to more suitably detect the information on the surface of the vehicle seat using the planar sensor sheet.

What is claimed is:

1. A sensor sheet having a planer shape to be disposed on a surface of a vehicle seat, the sensor sheet comprising:
    a pliable planar main body configured to be disposed along the surface of the vehicle seat;
    a plurality of flexible flat substrates provided in the main body;
    a plurality of detecting portions provided on upper surfaces of the plurality of flexible flat substrates; and
    a wiring line provided on the upper surfaces of the plurality of flexible flat substrates and that is configured to supply power to each of the detecting portions, wherein
    each of the plurality of flexible flat substrates has a band shape and the plurality of flexible flat substrates are arranged in a parallel manner at suitable intervals in the main body,
    each of the plurality of detecting portions is configured to transmit information detected from the surface of the vehicle seat to a controller through at least one of a wired and a wireless communication,
    the main body has an air permeability to enable circulation of air in a thickness direction of the main body, and
    the plurality of detecting portions are arranged at suitable intervals on the upper surfaces of the plurality of flexible flat substrates.

2. The sensor sheet according to claim 1, wherein the wiring line is a pair of the wiring lines provided along the upper surfaces of the plurality of flexible flat substrates such that the pair of wiring lines is electrically connected to each of the plurality of detecting portions.

3. The sensor sheet according to claim 1, wherein the plurality of detecting portions and a pair of wiring regions, as a part of the wiring line, are provided on the plurality of flexible flat substrates.

4. The sensor sheet according to claim 3, wherein each of the plurality of flexible flat substrates has an air permeable portion through which air is allowed to be circulated in a thickness direction of the main body.

5. The sensor sheet according to claim 4, wherein the air permeable portion is a plurality of air permeable portions provided at positions on each of the plurality of flexible flat substrates that are different than the plurality of detecting portions.

6. The sensor sheet according to claim 1, wherein a plurality of back-lining portions are provided on a backside surface of each of the plurality of flexible flat substrates opposite to the upper surface of each of the plurality of flexible flat substrates on which the plurality of detecting portions are provided to support each of the plurality of detecting portions.

7. The sensor sheet according to claim 3, wherein the pair of wiring regions are spaced from each other and extend in a parallel manner along each of the plurality of flexible flat substrates on opposite sides of the plurality of detecting portions arranged at the suitable intervals along the upper surfaces of each of the plurality of flexible flat substrates.

* * * * *